United States Patent [19]
Didelot

[11] Patent Number: 5,849,057
[45] Date of Patent: Dec. 15, 1998

[54] PROCESS FOR BENDING GLASS SHEETS

[75] Inventor: Claude Didelot, Thourotte, France

[73] Assignee: Saint Gobain Vitrage, Courbevoie, France

[21] Appl. No.: 851,489

[22] Filed: May 5, 1997

Related U.S. Application Data

[63] Continuation of Ser. No. 297,554, Aug. 31, 1994, abandoned.

[30] Foreign Application Priority Data

Aug. 31, 1993 [FR] France .................................. 93 10396

[51] Int. Cl.$^6$ ........................ C03B 23/029; C03B 23/027; C03B 23/03
[52] U.S. Cl. .................................. 65/106; 65/107; 65/291
[58] Field of Search ............................. 65/107, 106, 102, 65/287, 291, 273

[56] References Cited

U.S. PATENT DOCUMENTS

| | | | |
|---|---|---|---|
| 4,286,980 | 9/1981 | Matsuzaki et al. | 65/106 |
| 4,609,391 | 9/1986 | McMaster | 65/107 |
| 4,756,735 | 7/1988 | Cathers et al. | 65/107 |
| 4,804,397 | 2/1989 | Stas et al. | 65/107 |
| 4,909,820 | 3/1990 | Hirotsu et al. | 65/106 |
| 5,045,101 | 9/1991 | Hirotsu | 65/107 |
| 5,071,461 | 12/1991 | Hirotsu et al. | 65/107 |
| 5,108,480 | 4/1992 | Sugiyama | 65/107 |
| 5,167,689 | 12/1992 | Weber | 65/107 |
| 5,178,659 | 1/1993 | Watanabe et al. | 65/107 |
| 5,186,730 | 2/1993 | Weber | 65/289 |
| 5,364,436 | 11/1994 | Montonen | 65/107 |
| 5,383,990 | 1/1995 | Tsuji | 65/107 |
| 5,660,609 | 8/1997 | Muller et al. | 65/107 |

FOREIGN PATENT DOCUMENTS

| | | |
|---|---|---|
| 41021/89 | 4/1990 | Australia . |
| 0 338 216 | 10/1989 | European Pat. Off. . |
| 0 351 739 | 1/1990 | European Pat. Off. . |
| 0 414 232 | 2/1991 | European Pat. Off. . |
| 0 445 672 | 9/1991 | European Pat. Off. . |
| 869 518 | 5/1961 | United Kingdom . |
| 887 770 | 1/1962 | United Kingdom . |

*Primary Examiner*—Steven P. Griffin
*Attorney, Agent, or Firm*—Oblon, Spivak, McClelland, Maier & Neustadt, P.C.

[57] ABSTRACT

The invention relates to a process for bending glass sheets. This process includes bending the glass sheet or sheets in at least two stages. The first stage employing the action of gravity leading to a shaped blank which is used in the formation of the final shape. The last stage which leads to the final shape, includes the simultaneous or nonsimultaneous, combined actions of gravity and at least one additional mechanical force. The invention also includes a bending apparatus providing at least one section including two separately useable parts with one of the parts being movable with respect to the other to permit the section to be arranged in one of two positions. In addition, the invention includes bent glazing having at least one docking angle exceeding 50° and a radius of curvature below 200 mm.

7 Claims, 3 Drawing Sheets

FIG_1

PROCESS FOR BENDING GLASS SHEETS

This application is a continuation of application Ser. No. 08/297,554, filed on Aug. 31, 1994, now abandoned.

BACKGROUND OF THE INVENTION

1. Field of the Invention

The invention relates to the bending of glass sheets, and in particular the bending on a hollowed out shape or configuration referred to as a bending frame or skeleton.

2. Discussion of the Background

The bending of glass sheets on a skeleton is widely used for bending glass sheets and in particular for simultaneously bending two glass sheets to be used in forming a bent laminated glazing such as a car windshield. Such a frame-bending method permits the production of glazing having complex curvatures and more particularly a double curvature. In this method, the two superimposed glass sheets, with an adequate interposed separating agent, are supported along their marginal end portions in a substantially horizontal manner by a frame having the desired profile, i.e., the profile corresponding to the final profile of the two bent glass sheets. Supported in this way, the glass sheets pass into a bending furnace, generally a tunnel furnace. The bending furnace is generally a tunnel furnace having heating zones at different temperatures.

The first of these zones is generally a preheating zone in which the glass sheets are heated to a glass temperature close to the softening point. The following zone is the bending zone where the glass sheets, heated to a temperature of approximately 600° C., will progressively bend by gravity in order to adapt at the periphery to the shape of the frame and achieve the desired curvatures. The glass sheets are then cooled so that, on leaving the tunnel furnace, they are removed from the shaping frame. This skeleton bending process is entirely satisfactory, particularly when the curvatures are not very pronounced and/or when the bending is essentially cylindrical. When the curvatures are more pronounced, particularly in the vicinity of the periphery of the glazings, it can occur that there is a so-called counter-bending at the corners of the glass sheets and in general at two of these corners or even at the four corners as a function of the geometry of the glazing, i.e., its final or definitive curvatures and also its initial cutting shape.

Counter-bending corresponds to an undesired inversion in this curvature case. The counterbent glass sheets obtained no longer meet the requirements imposed on the glazing to permit installation in a car body bay. To obviate such a counter-bending, EP-A-448 447 proposes a gravity bending process having at least two stages.

The first bending stage consists of the gravity bending of the glass sheets in accordance with a first shape corresponding to a blank of the final shape. During this first stage, the glass sheets are supported by a first peripheral line provided by the bending frame.

The second bending stage consists of the gravity bending of the glass sheets in accordance with the final shape while being supported by a second peripheral line from the same frame. For this purpose, the frame is constituted on at least one portion or section of its periphery by a duplicated structure, i.e., a structure comprising selectively usable parts.

This bending process is satisfactory for the bending of two glass sheets to be used in the production of a glazing such as the windshield of an existing car. However, it has a limit linked with the so-called "docking" angle, i.e., the angle formed by a tangential vector to the side end of the widest part of the glazing with the horizontal plane, when the bent glazing is placed in a horizontal position.

The bending process described hereinbefore makes it possible to produce glazings having docking angles with a maximum value of approximately 45° for small radii of curvature. However, present demands more particularly with respect to car windshields are directed at docking angles exceeding 50° and which can even reach 80°.

In order to obviate the counter-bending, in the case of the bending of only one glass sheet, which is to be thermally tempered or toughened and for which purpose it is heated to a high level, U.S. Pat. No. 3,511,628 proposes holding the edges of said sheet during the bending operation. With such a process it would appear possible to bend a glass sheet having docking angles exceeding 50°. However, this process is not satisfactory in the case of bending several glass sheets simultaneously.

EP-B-250 311 proposes the use of a force, in addition to the force of gravity, applied to the upper face of the glass sheet above the location subject to counter-bending. Such a process would also appear to be able to facilitate the production of docking angles in excess of 50°. However, this process is not satisfactory for all glazing shapes which are subject to undesired counter-bending during their passage through bending furnaces.

SUMMARY OF THE INVENTION

An object of the present invention is to bend one or more glass sheets simultaneously on a frame or skeleton while avoiding counter-bending over an excessive area of the glazing and making it possible to obtain glazings having large docking angles, more particularly angles exceeding 50°, with small radii of curvature in the docking zones. The term small radii of curvature is understood to mean radii of curvature below 200 mm and often below 150 mm.

According to the invention this object is achieved by a frame bending process for at least one glass sheet during which the stacked glass sheets placed on the bending frame, in the horizontal position, are heated to their deformation temperature and bent in at least two stages. The first stage consisting of the action of gravity on the glass sheet or sheets leading to a blank of the final shape. The final stage leading to the final shape of the glass sheet or sheets. The final shape being reached during said final stage by the simultaneous or non-simultaneous combination of the actions of gravity and at least one additional mechanical force.

In a first embodiment, the additional mechanical force is a pressing force exerted by at least one shaping part.

The thus defined process makes it possible to obtain bent glazings only having a counter-bending in areas limited to 20 mm from the glazing edge and having docking angles exceeding 50°, for radii of curvature below 150 mm in the docking zones. However, the pressing actions exerted on the glass at its deformation temperature can, as a function of the shaping part used, leave marks. The latter can, if appropriate, be subsequently masked, in particular by enamel, when they are sufficiently close to the edges of the glazing.

In a second advantageous embodiment according to the invention, the additional mechanical force is a resistance force exerted by at least one shaping part to which is applied the glass sheet or sheets. According to said second embodiment the glass is subject to a type of drawing or rolling action around the shaping part and the latter consequently leaves no track or mark on the surface of the glass sheet coming into contact therewith.

According to a preferred embodiment of the invention during the first stage essentially at least one blank of the transverse curvature is made. The following bending stages then consist of terminating the transverse curvature and bringing about the longitudinal curvature.

It is also possible in the first stage to bend essentially in accordance with the transverse curvature and also in accordance with the longitudinal curvature but localized for the latter in the median portion of the glass sheet or sheets. Then, in the final stage, the complimentary longitudinal bending takes place, localized in the peripheral portions of the glass sheet or sheets.

According to an embodiment of the process of the invention, the first bending stage is carried out while supporting the glass sheet or sheets along a first peripheral line. If appropriate, the peripheral line can vary during the first stage and the final bending stage when the final bending stage is then performed by supporting the glass sheet or sheets; in accordance with a second different and final curvature peripheral line.

In an embodiment of the process using two peripheral lines, the latter are completely separate. The substitution of one line for the other takes place either by raising the level of the second line with respect to that of the first, or by lowering the level of the first line, with respect to the second or by a combination of a raising of the level of part of the second line and a raising of the level of part of the first line.

According to another embodiment of the process using two peripheral lines, the second peripheral line is only separate in portions from the first line. The distinction preferably applies to the lateral portions of the two lines.

The peripheral lines according to the invention are generally continuous lines. This is true, in particular, for the peripheral lines that define the final bent shape of the glass sheet or sheets. However, a line formed from several points or sections located at suitable locations can also be appropriate, particularly for the line defining the blank.

Under one of the aspects of the invention and in particular so as to prevent counter-bending, the first peripheral line used for producing the first bending stage is such that the angle formed by any tangential vector to the frame at said line with the horizontal plane is below 20° and preferably below 15°.

The invention also includes the apparatus for performing the process as described hereinbefore. This apparatus for the bending of at least one glass sheet comprises on the one hand a frame, wherein at least one section which comprises two parts with one of the parts movable with respect to the other so that the section can be arranged in either one of two positions, the first position leading to a shaped blank and the second position to the final shape. In addition, at least one shaping part intervenes in combination with the second position of said one section for the formation of the final shape. The apparatus also includes means permitting a relative approach of the shaping part and the frame for the application of said shaping part to the glazing or vice versa.

Preferably, during the formation of the final shape, at least one section of the frame is movable in the direction of at least one stationary shaping part.

According to a first embodiment, the at least one section comprises at least an extreme lateral portion of the frame. According to a second embodiment, the at least one section of the frame extends over substantially the entire frame periphery.

According to an advantageous embodiment of the invention, the at least one section of the frame is constituted by pivoting members of the frame.

According to one of the aspects of the invention, the blank frame is such that the angle formed by any tangential vector to said frame with the horizontal plane is below 20° and preferably below 15°.

In its final position the frame advantageously has an angle, formed by a tangential vector to the lateral end of the widest portion of the frame and the horizontal plane exceeding 50° and able to reach 80°.

The shaping parts are preferably surface members, i.e. intended to have a surface contact. The bending apparatus according to the invention generally comprises two shaping parts arranged symmetrically with respect to the frame axis. The shaping part can be in an extreme construction a single member covering the entire glazing.

In one embodiment, the contact with the glass sheet can be linear in accordance with one or more consecutive lines positioned at the desired locations.

In another embodiment, the contact can be punctiform in accordance with one or more points at the desired location.

According to these two embodiments, the shaping parts are advantageously multiple so as to constitute discontinuous; surfaces.

BRIEF DESCRIPTION OF THE DRAWINGS

Other advantageous details and features can be gathered from the following description of non-limitative embodiments of the apparatus according to the invention with reference to the attached drawings, wherein.

DESCRIPTION OF THE PREFERRED EMBODIMENTS

Figure 1:
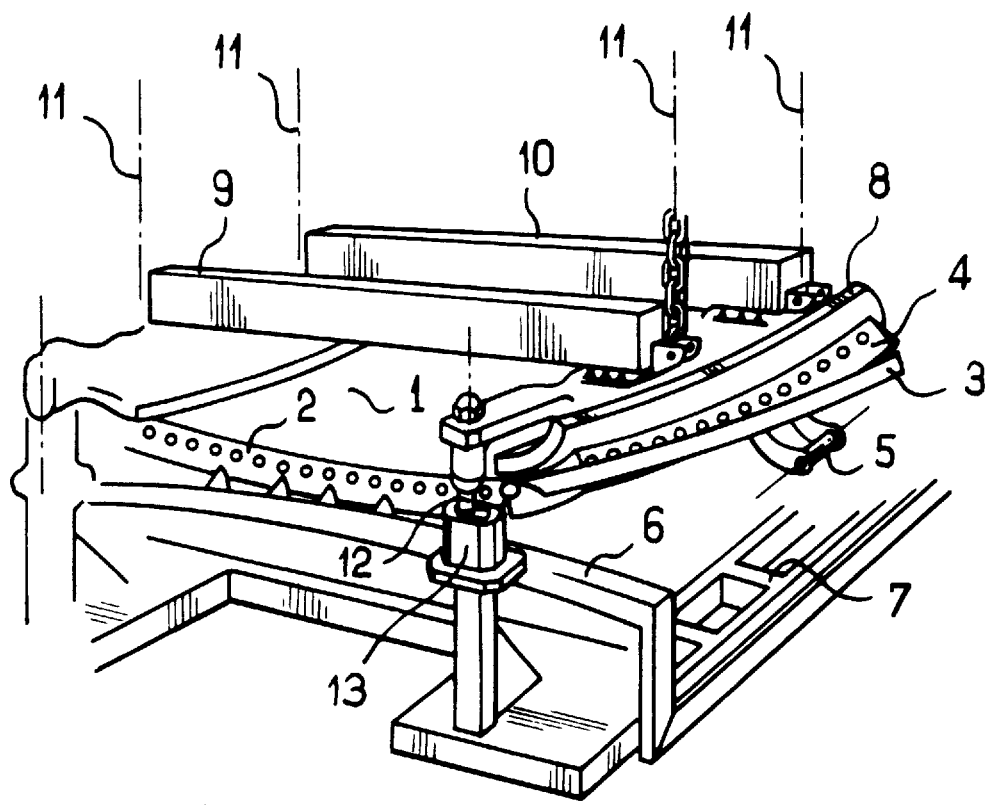
FIG. 1 is a perspective view of an apparatus according to the invention.

FIG. 1 illustrates an apparatus according to the invention. A frame 1 has two longitudinal parts or side-members 2, of which only one is visible in the drawing, and two transverse parts or cross-members 3. Only one of these cross-members 3 is visible in the drawing. These different members are connected by spindles (not shown) ensuring the rigidity of the system, and thus form a fixed frame representing the profile of the desired blank. The frame has a hollowed out shape including an upper outer edge which defines a first peripheral line for supporting the glass sheet in a substantially horizontal plane prior to the first bending stage.

Around the fixed cross-members 3 are internally installed pivoting cross-members 4 having different curvatures from the fixed cross-members 3. These pivoting cross-members 4 can adopt two different positions, the first being shown in FIG. 1. In this case, a deposited glass sheet comes into contact with the assembly of the fixed frame and adopts its shape when brought to its softening point.

Reference will be made hereinafter to the second position of the pivoting cross-members 4. The passage from one to the other of these positions can take place in the case of FIG. 1 by an action on the handle 5, which brings about the pivoting of the cross-member 4. The handle 5 only constitutes one example for modifying the position of the pivoting cross-members 4. It could also be constituted by weights fixed to rods integral with the pivoting cross-members 4 and serving as a pendulum for rotating said members 4.

The frame 1 is supported by a skeleton 6 which can be moved along rails 7. In this way it is possible to move the frame on which are arranged the glass sheets within a tunnel furnace having zones for heating to different temperatures.

Above the frame is shown a shaping part 8 used during the bending of the glass sheets and reference will be made hereinafter to said part 8. It is connected to another, not shown shaping part positioned symmetrically at the other end of the frame 1, by means of two beams 9, 10. These beams 9, 10 are held by devices 11, symbolized by a chain, which make it possible to vary the height of the position of the shaping parts 8. With the beams 9, 10 are also associated elements 12 or "fingers" which can be positioned in "female elements" 13, so as to center the shaping parts 8 relative to the frame 1. These elements 12 also maintain a space defined between the shaping parts 8 and the frame 1 and are advantageously placed at the four corners of the frame 1.

The shaping part 8 is shown in FIG. 1 as an element having a curvature in accordance with a small radius of curvature below 200 mm and extending over the entire frame width. This shaping part 8 is associated with another identical part arranged symmetrically to the other frame end. However, this representation is not limitative. Thus, each can be replaced by several elements positioned in juxtaposed manner so as to form a discontinuous surface. It is also possible to have a single shaping part covering the entire frame 1.

Figure 2:
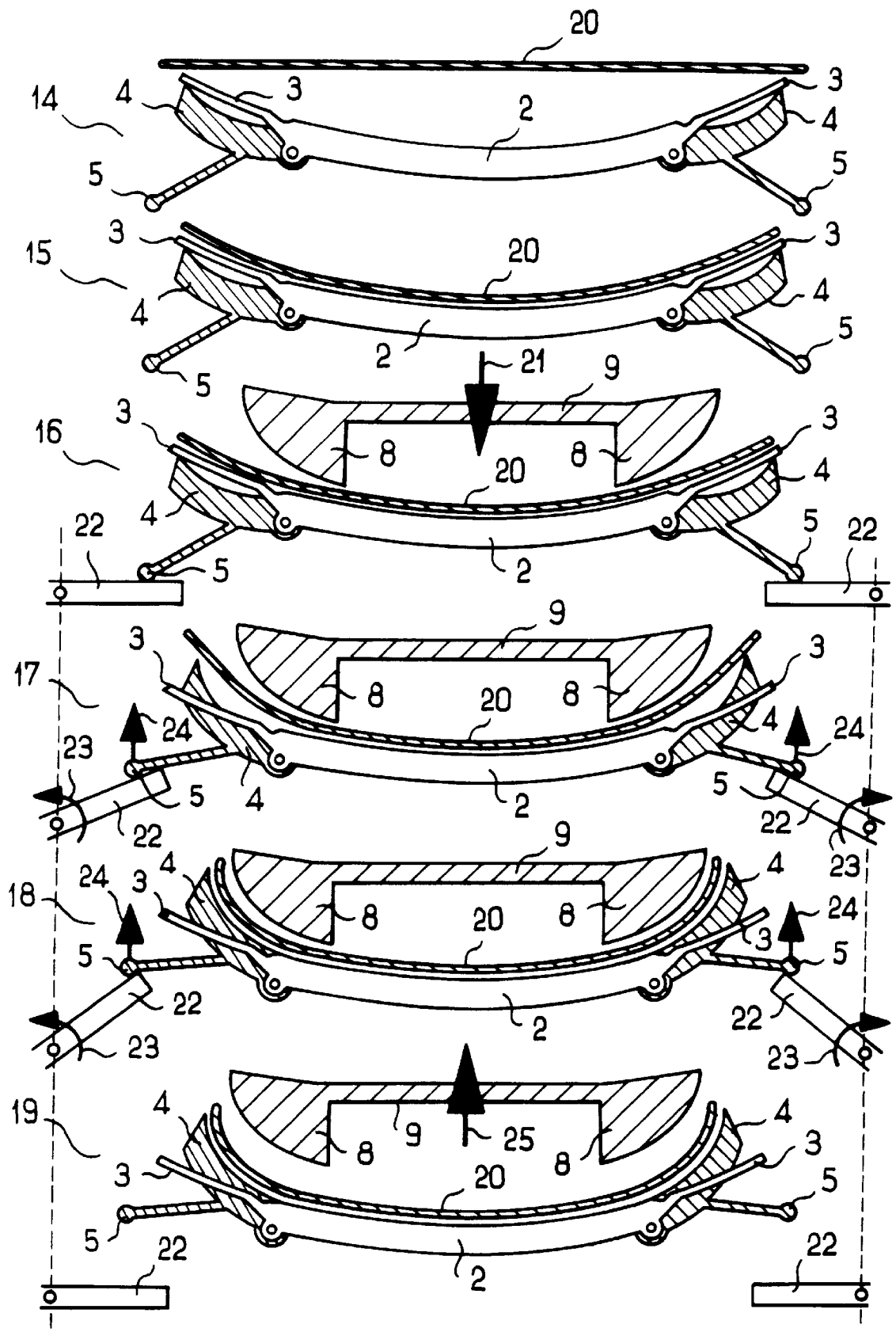
FIG. 2 is a diagrammatic representation in six stages of the process according to the invention.

FIG. 2 illustrates the process according to the invention in six chronological stages 14, 15, 16, 17, 18 and 19. In order to facilitate the explanation, reference will be made to the first or blank position and the second or final position, the passage from one to the other taking place by the rotation of the pivoting parts 4.

Diagram 14 shows the frame 1 in its first position. Two glass sheets 20, symbolized by a thick line, are placed on the frame being centered, e.g., by means of edge rolls not shown placed on the frame periphery. The lower glass sheet bears at several points or sections on the frame at approximately 5 mm from its edge. The angle formed by a tangential vector to the widest lateral end of the frame and the glass sheets, which then form a horizontal plane, is approximately 15°. The drawings are only diagrams which do not accurately reveal this value. This value makes it possible to avoid counter-bending when the glass sheets adopt the shape of the frame.

The frame 1 is then brought into the bending furnace by movement along the rails 7. In a first phase, the assembly undergoes preheating and then in a second phase, which maintains the glass at a temperature close to its softening point, the glass sheets sag by gravity. The result is represented by diagram 15.

The glass sheets bear on the periphery of the fixed frame and mainly on the central portions of the side members 2. Thus the sheets assume the shape of a blank with the final curvatures to be obtained. This blank shape in particular has a transverse curvature close to or exceeding that of the final transverse curvature.

When the blank shape has been obtained, the frame can again be moved along the rails 7 and is positioned under the shaping parts 8. The shaping parts 8 are then in a raised position so as to prevent any risk of friction of the glass sheets during displacement. The shaping parts are then brought into a lowered position with the aid of the devices 11. This movement is symbolized by the arrow 21 on diagram 16. The shaping parts 8 are then in contact with the glass sheets, but exert no force thereon. This is possible as a result of the devices 11 permitting a fine setting of the position of the shaping parts.

The diagrams 17 and 18 represent the modification of the peripheral line of the frame 1. The diagram 17 represents the frame during modification and diagram 18 represents it in its final position. Members 22, e.g., performing a rotary movement symbolized by the arrows 23 bring about the movement of the handles 5 symbolized by the arrows 24 and therefore the rotation of the pivoting cross-members 4. These members 4 pivot within the cross-members 3 and are finally positioned above the latter so as to form the final position of the frame. Therefore the final curvatures are obtained. In the final position shown on diagram 18, a tangential vector to the lateral end of the widest part of the frame forms an angle with the horizontal plane exceeding 50° and able to reach 80° or more, as a function of the curvature given to the pivoting cross-members 4. The forces exerted on the movable cross-members 4 must be adequate to bring about the rotation thereof as well as curvature of the glass sheets resting thereon.

The shaping parts 8 then exert resistance forces on the entire surface of the glass sheets in contact therewith. The rotation of the pivoting cross-members 4 brings about the shaping by the winding of the glass sheets around these shaping parts 8. It is therefore possible to obtain docking angles exceeding 50° without any counter-bending in the corners of the glass sheets. When the final shape is obtained, the shaping parts 8 are raised. This stage is symbolized by the arrow 25 on diagram 19. The frame 1 can again be moved along the rails 7 to a cooling zone.

Figure 3A:
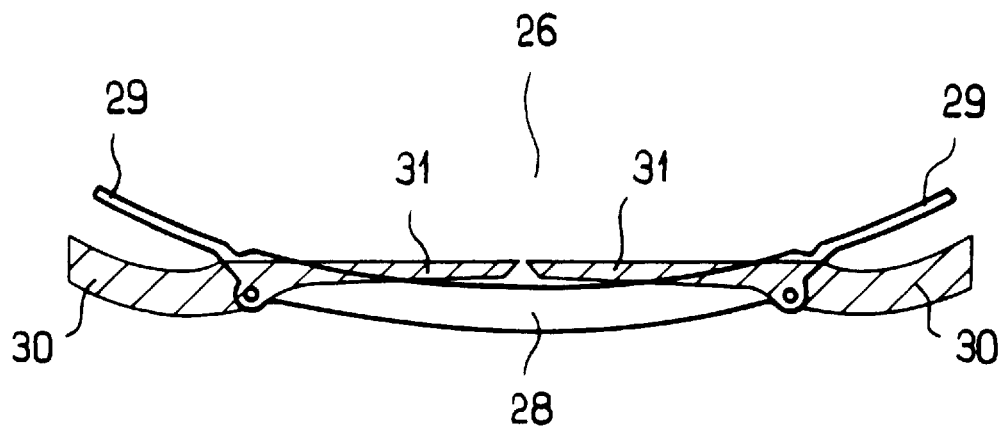
FIG. 3 is a diagrammatic representation of another embodiment of an apparatus according to the invention.
Figure 3B:
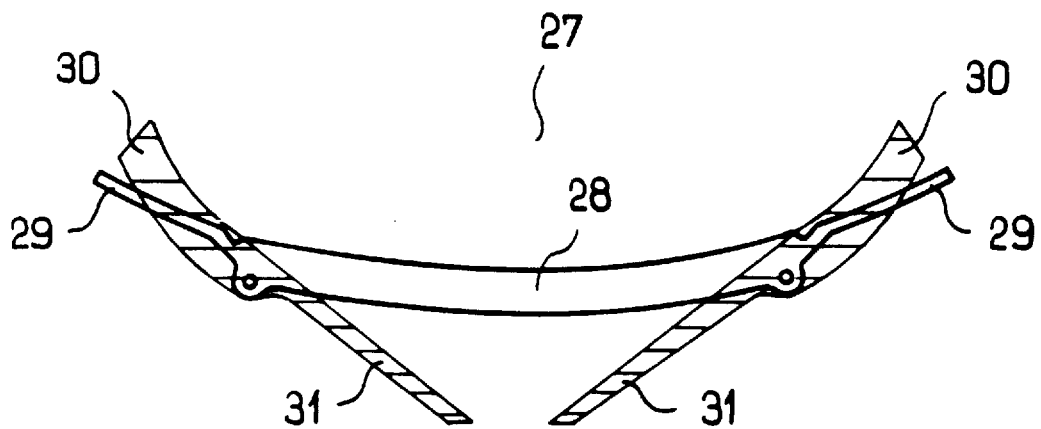

FIG. 3 shows another embodiment of a frame according to the invention. This frame is also constituted by a fixed part formed by two side-members 28 and two cross-members 29. However, the pivoting parts duplicate the frame on virtually its entire periphery. Each pivoting part is constituted by a cross-member 30 and two side-members 31. According to this embodiment, the frame leading to a blank shape shown in diagram 26 is constituted by fixed cross-members 29 and half-side-members 31. In the second position shown in diagram 27, the frame corresponding to the final shape is formed by pivoting cross-members 30 and fixed side-members 28. In the case shown in FIG. 3, as the longitudinal curvature is only slightly pronounced in the first position (diagram 26), the transverse curvature is essentially obtained on the blank position of the frame.

The bent glass sheets obtained according to the invention can be used for the manufacture of a laminated glazing by interposing between them at least one, e.g., polyvinyl butyryl intercalated sheet.

According to the invention, the apparatus leaves very few tracks or marks on the glass sheets. Thus, the marks left by the frame on the lower sheet are located on the periphery and very close to the edge and can therefore be in the area covered by the joint used for installing the glazing in the car body bay and are consequently invisible on the fitted glazing.

It may appear that at least partially there is a double mark, because the frame is at least partly duplicated. However, the duplicated parts are produced in such a way that the pivoting parts leaves a mark as close as possible to that left by the fixed part. Therefore both marks are masked at the same time by the installation joint. Both marks, characteristic of a laminated glazing obtained according to this process can, e.g., be observed by high incidence reflection under a projector.

With regards to the contacts between the shaping parts 9, 10 and the upper glass sheet, they leave virtually no mark.

It is also possible to use intercalated sheets of metal mesh filament or thread type enveloping the shaping parts and more effectively protecting the glass sheets.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for bending at least one glass sheet on a frame, comprising the steps of:
   (a) placing the sheet on said frame in a horizontal position;
   (b) raising the temperature of the glass sheet to its deformation temperature;
   (c) bending said sheet in at least a first stage and a final stage comprising subjecting said sheet at its deformation temperature to the force of gravity to effect the first stage of bending and subjecting said sheet to at least one additional mechanical force to effect the final stage of bending wherein the additional mechanical force is a resistance force against the upper surface of the glass sheet permitting the bending of the glass sheet;
   (d) supporting the glass sheet along a first peripheral line while carrying out the first stage of bending; and
   (e) supporting the glass sheet along a second peripheral line having a different curvature than said first peripheral line which takes the place of the first peripheral line while carrying out the final stage of bending.

2. A process according to claim 1, wherein the first stage of bending comprises of producing at least one blank having a transverse curvature.

3. A process according to claim 1, wherein:
   (a) the first stage of bending comprises bending said at least one glass sheet essentially along a transverse curvature and along a longitudinal curvature localized for the latter in a median portion of the glass sheet; and
   (b) the final stage of bending comprises an essentially longitudinal, complimentary bending localized on peripheral portions of the glass sheet.

4. A process according to claim 1, wherein the peripheral lines are at least partly separate from one another.

5. A process according to claim 4, wherein the first peripheral line includes lateral portions and said second peripheral line is at least partly separate from said first peripheral line along said lateral portions.

6. Process according to claim 5, further comprising the step of raising a level of at least part of the second peripheral line above a level of said first peripheral line prior to said final stage of bending.

7. A process according to claim 1, wherein the frame has a hollowed out shape including an upper outer edge which defines the first peripheral line for supporting said glass sheet in a substantially horizontal plane prior to said first stage of bending, and wherein an angle formed by a tangential vector to said frame at said first peripheral line with said horizontal plane is below 20°.

* * * * *